United States Patent Office
3,819,756
Patented June 25, 1974

3,819,756
DITHIOPHOSPHORIC ESTERS

Peter Beutel, Mannheim, Karl-Heinz Koenig, Frankenthal, Heinrich Adolphi, Limburgerhof, Falk Rittig, Ludwigshafen, and Hans Urbach, Lampertheim, Germany, assignors to Badische Anilin- & Soda-Fabrik Aktiengesellschaft, Ludwigshafen (Rhine), Germany
No Drawing. Filed May 24, 1972, Ser. No. 256,479
Int. Cl. A01n 9/36; C07f 9/16
U.S. Cl. 260—956    3 Claims

ABSTRACT OF THE DISCLOSURE

New and valuable dithiophosphoric triesters having a strong insecticidal and nematocidal action and a process for controlling pests with these compounds.

---

The present invention relates to new and valuable dithiophosphoric ester derivatives having a strong insecticidal and nematocidal action; pesticides containing these compounds as active ingredients; and their use as pesticides.

We have found that dithiophosphoric-O,S,S-triesters of the formula

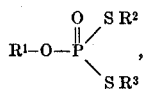

where $R^1$ denotes an aliphatic hydrocarbon radical of 1 to 3 carbon atoms (methyl or ethyl), $R^2$ denotes methoxy-substituted alkyl of 1 to 4 carbon atoms, linear alkenyl or alkynyl of 3 to 5 carbon atoms—especially a propyn-(1)-yl-(3) or butyn-(2)-yl-(4) radical—and $R^3$ has the same meanings as $R^2$ and additionally denotes alkyl of 2 to 4 carbon atoms, have a good insecticidal and nematocidal action.

The active ingredients may be prepared by reacting dichlorides of phosphoric acid alkyl esters of the formula

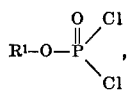

where $R^1$ has the above meanings, with mercaptans.

It has proved advantageous to prepare the compounds in the presence of acid-binding agents, particularly organic bases such as pyridine and triethylamine. It is however also possible to react preferably the alkali metal salts of the mercaptans with dichlorides of phosphoric acid alkyl esters of the above formula. The reaction is advantageously carried out in an inert organic solvent at a temperature from 0° to 150° C., preferably 30° to 100° C. Solvents which are particularly suitable are benzene, toluene, nitriles and esters of organic acids. To increase the yield the starting materials are combined and the mixture is heated and stirred for a fairly long period of time at the temperature described above. When the reaction is over, the mixture is evaporated, dissolved in benzene, and washed with a 5% by weight aqueous caustic solution, water, a 3% by weight aqueous sodium hydrogen sulfate solution and again with water and the benzene solution is dried and concentrated over sodium sulfate. The reaction products are then purified by removing all readily volatile byproducts by heating under an oil-pump vacuum at a temperature of from 60° to 80° C.

If organic bases are used, filtration may be carried out and the filtrate washed and worked up as described above.

The active ingredients may however also be prepared by reacting sodium, potassium or tetraalkylammonium salts of dithiophosphoric-O,S-diesters of the formula

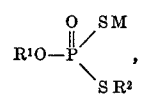

where $R^1$ and $R^2$ have the above meanings and M denotes a cation, with organic halogen compounds.

In this method, the salt is suspended in an organic solvent, preferably acetonitrile, and the organic halogen compound is added at room temperature.

After boiling under reflux for several hours to increase the yield, the organic solvent is evaporated and the residue dissolved in methylene chloride and washed with a 3% by weight aqueous sodium hydrogen carbonate solution and water. The product is obtained by drying over sodium sulfate and distilling off the methylene chloride. For further purification the product is concentrated under an oil-pump vacuum.

The compounds used as starting materials are known or easily accessible by known methods (Houben-Weyl, "Methoden der organischen Chemie," Organic Phosphorus Compounds, Part 2, Georg Thieme Verlag, 1964).

The new compounds are usually reddish to brown colored oils which are insoluble in water and which cannot be distilled without decomposition even at a greatly reduced pressure.

The compounds have an excellent insecticidal and particularly nematocidal action on a multitude of pests.

The preparation of the new compounds by the various methods and their use is illustrated by the following examples.

EXAMPLE 1

24 parts of propynyl bromide is added to a solution of 27 parts of the sodium salt of dithiophosphoric-O-methyl ester-S-n-propyl ester in 100 parts of acetonitrile. After boiling for 7 hours under reflux the acetonitrile is evaporated and the residue dissolved in methylene chloride and washed with a 3% by weight sodium hydrogen carbonate solution and water, and dried over sodium sulfate. After concentration of the solution, finally for 30 minutes under an oil-pump vacuum at 60° C., there is obtained dithiophosphoric-O-methyl ester-S-propargyl ester-S-n-propyl ester.

$n_D^{25}$: 1.5368
$C_7H_{13}O_2PS_2$ (224):
 Calc.: C, 37.5; H, 5.8; P, 13.8; S, 28.6.
 Found: C, 36.3; H, 5.3; P, 13.8; S, 28.0.

EXAMPLE 2

At room temperature, 8 parts of propynyl bromide is dripped into 13 parts of the potassium salt of dithiophosphoric-O-methyl ester-S-propynyl ester in 50 parts of acetonitrile; the whole is then stirred for 3 hours at 45° C. The potassium bromide formed is removed by suction filtration, the filtrate is concentrated and the reaction product dissolved in benzene and washed with sodium hydrogen carbonate solution and water. After drying over sodium sulfate and evaporating off the solvent, finally at 40° C. under an oil-pump vacuum, there is obtained dithiophosphoric-O-methyl ester-S,S-dipropynyl ester.

$n_D^{25}$: 1.5632
$C_7H_9PO_2S_2$ (220.2):
 Calc.: C, 38.2; H, 4.1; P, 14.1.
 Found: C, 37.5; H, 3.7; P, 13.1.

Further compounds may be prepared in similar manner; examples of synthesized compounds are given below.

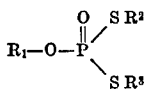

| R¹ | R² | R³ | $n_D^{25}$ |
|---|---|---|---|
| CH₃ | n-C₃H₇ | CH₂—O—CH₃ | 1.5166 |
| C₂H₅ | CH₂CH=CH₂ | CH₂CH=CH₂ | 1.5298 |
| CH₃ | n-C₃H₇ | CH₂—C≡CH | 1.5368 |
| C₂H₅ | n-C₃H₇ | CH₂—C≡CH | 1.5133 |
| CH₃ | n-C₃H₇ | CH₂—C≡C—CH₃ | 1.5364 |
| C₂H₅ | n-C₃H₇ | CH₂—C≡C—CH₃ | 1.5170 |
| CH₃ | CH₂—C≡CH | CH₂—C≡CH | 1.5632 |
| C₂H₅ | CH₂—C≡CH | CH₂—C≡CH | 1.5352 |
| CH₃ | CH₂—C≡C—CH₃ | CH₂—C≡C—CH₃ | 1.5623 |
| C₂H₅ | CH₂C≡C—CH₃ | CH₂—C≡C—CH₃ | 1.5400 |
| CH₃ | CH₂—C≡CH | CH₂—C≡C—CH₃ | 1.5662 |
| C₂H₅ | CH₂—C≡CH | CH₂—C≡C—CH₃ | 1.5348 |

The agents according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, hydrocarbons having boiling points higher than 150° C., e.g. tetrahydronaphthalene or alkylated naphthalenes, or organic liquids having boiling points higher than 150° C. and having one or more than one functional group, e.g. the keto group, the ether group, the ester group or the amide group, this group or these groups being attached as substituent(s) to a hydrocarbon chain or being a component of a heterocyclic ring, may be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g. kieselguhr, talc, clay or fertilizers.

EXAMPLE 3

90 parts by weight of the compound of Example 1 is mixed with 10 parts by weight of N-methyl-α-pyrrolidone. A mixture is obtained which is suitable for application in the form of very fine drops.

EXAMPLE 4

20 parts by weight of the compound of Example 2 is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 5

20 parts by weight of the compound of Example 1 is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 6

20 parts by weight of the compound of Example 2 is dissolved in a mixture consisting of 25 parts by weight of cyclohexanol, 65 parts by weight of a mineral oil fraction having a boiling point between 210° and 280° C., and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 7

20 parts by weight of the compound of Example 1 is well mixed with 3 parts by weight of the sodium salt of diisobutylnaphthalene-α-sulfonic acid, 17 parts by weight of the sodium salt of a lignin-sulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1% by weight of the active ingredient.

EXAMPLE 8

3 parts by weight of the compound of Example 2 is intimately mixed with 97 parts by weight of particulate kaolin. A dust is obtained containing 3% by weight of the active ingredient.

EXAMPLE 9

30 parts by weight of the compound of Example 1 is intimately mixed with a mixture consisting of 92 parts by weight of powdered silica gel and 8 parts by weight of paraffin oil which has been sprayed onto the surface of this silica gel. A formulation of the active ingredient is obtained having good adherence.

For the biological experiments the following active ingredients were used:

1. $CH_3-O-\overset{\overset{O}{\|}}{P} \overset{S-CH_2-C\equiv CH}{\underset{S-C_3H_7}{\diagup}}$ (according to the invention)

2. $C_2H_5-O-\overset{\overset{O}{\|}}{P} \overset{S-CH_2-C\equiv CH}{\underset{S-C_3H_7}{\diagup}}$ (according to the invention)

3. $CH_3-O-\overset{\overset{O}{\|}}{P} \overset{S-CH_2-C\equiv CH}{\underset{S-CH_2-C\equiv CH}{\diagup}}$ (according to the invention)

4. $C_2H_5-O-\overset{\overset{O}{\|}}{P} \overset{S-CH_2-C\equiv CH}{\underset{S-CH_2-C\equiv CH}{\diagup}}$ (according to the invention)

5. $C_2H_5-O-\overset{\overset{O}{\|}}{P} \overset{S-CH_2-C\equiv CH}{\underset{S-CH_2-C\equiv C-CH_3}{\diagup}}$ (according to the invention)

6. $CH_3-O-\overset{\overset{O}{\|}}{P} \overset{S-CH_2-C\equiv CH}{\underset{S-CH_2-CH=CH_2}{\diagup}}$ (according to the invention)

7. $C_2H_5-O-\overset{\overset{O}{\|}}{P} \overset{S-CH_2-C\equiv CH}{\underset{S-CH_2-CH=CH_2}{\diagup}}$ (according to the invention)

I. $C_2H_5-O-\overset{\overset{O}{\|}}{P} \overset{S-CH_2-CH_2-CH_3}{\underset{S-CH_2-CH_2-CH_3}{\diagup}}$ (prior art compound)

EXAMPLE 10

Contact action on houseflies (*Musca domestica*)

1 μl. of an acetonic solution of the active ingredients is applied to the ventral abdomen of houseflies under slight CO₂ narcosis. The action is determined after 4 hours and a dose-effect curve is drawn up from which the $LD_{50}$ in γ/fly is calculated.

RESULTS

| Active ingredient: | $LD_{50}$ γ/fly |
|---|---|
| 1 | 0.13 |
| 2 | 0.64 |
| 3 | 0.36 |
| 4 | 0.40 |
| 5 | 0.41 |
| 6 | 0.48 |
| I | 0.75 |

EXAMPLE 11

Oral intake and contact test on caterpillars of the cabbage moth (*Plutella maculipennis*)

Young cabbage leaves are dipped in aqueous emulsions of the active ingredients for 3 seconds. After drying the leaves, larvae of the cabbage moth (*Plutella maculipennis*) in the forth larval stage are placed on the leaves. The mortality rate is determined after 48 hours.

RESULTS

| | Concentration (percent) | Mortality (percent) |
|---|---|---|
| Active ingredient: | | |
| 1 | 0.005 | 100 |
| | 0.0025 | 80 |
| 6 | 0.005 | 90 |
| | 0.0025 | 30 |
| I | 0.01 | 90 |
| | 0.005 | 30 |
| | 0.0025 | Ineffective |

EXAMPLE 12

Action on mosquito larvae (*Aedes aegypti*)

Larvae in the fourth development stage are used for this experiment. 50 animals in each case are placed in 200 ml. of boiled tap water to which the emulsified active ingredient has been added. The action is determined after 24 hours.

RESULTS

| | Concentration (p.p.m.) | Mortality (percent) |
|---|---|---|
| Active ingredient: | | |
| 4 | 0.1 | 95 |
| 7 | 0.1 | 90 |
| I | 0.5 | 30 |

EXAMPLE 13

Action on spinning mites (*Tetranychus telarius*) in beans

Bean plants heavily infected by spinning mites are sprayed to run-off with aqueous emulsions of the active ingredients. After 12 days the plants are inspected for still living mites.

RESULTS

| Active ingredient: | Concentration (percent) |
|---|---|
| 4 | 0.05 effective. |
| 7 | 0.05 effective. |
| I | 0.1 ineffective. |

EXAMPLE 14

Systemic action on aphids (*Aphis fabae*)

Bean plants (*Vicia faba*) growing in pots are infected with the bean aphid (*Aphis fabae*). After extensive colonies have developed, the soil in which the plants are growing is treated with 30 ml. of emulsions of the active ingredients. The action is determined after 24 hours.

RESULTS

| | Concentration (percent) | Action |
|---|---|---|
| Active ingredient: | | |
| 1 | 0.02 | Effective. |
| 2 | 0.05 | Do. |
| 3 | 0.05 | Do. |
| 5 | 0.10 | Do. |
| I | 0.10 | Ineffective. |

We claim:
1. A dithiophosphoric-O,S,S-triester of the formula

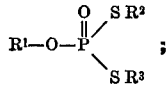

where $R^1$ denotes methyl or ethyl, $R^2$ denotes propargyl or butyn-(2)-yl-(4) and $R^3$ denotes alkyl of 2 to 4 carbon atoms, propargyl or allyl.

2. Dithiophosphoric-O-methyl ester-S-propargyl ester-S-n-propyl ester.

3. Dithiophosphoric-O-methyl ester - S,S - dipropynyl ester.

References Cited
FOREIGN PATENTS
29,847   3/1969   Japan _____ 260—963

LORRAINE A. WEINBERGER, Primary Examiner
R. L. RAYMOND, Assistant Examiner

U.S. Cl. X.R.
260—950, 957; 424—217, 219

UNITED STATES PATENT OFFICE
CERTIFICATE OF CORRECTION

Patent No. 3,819,756          Dated June 25, 1974

Inventor(s)  Peter Beutel et al

It is certified that error appears in the above-identified patent and that said Letters Patent are hereby corrected as shown below:

First page, left-hand column, line 11, insert
-- [30]  Foreign Application Priority Data
       June 24, 1971   Germany . . . . P 21 31 402.3 --.

Column 3, Table in line 11, "1.5662" should read --1.5622--.

Signed and sealed this 7th day of January 1975.

(SEAL)
Attest:

McCOY M. GIBSON JR.            C. MARSHALL DANN
Attesting Officer             Commissioner of Patents